United States Patent [19]

Castagna

[11] Patent Number: 4,688,121
[45] Date of Patent: Aug. 18, 1987

[54] CASSETTE ADAPTOR FOR 8-TRACK CARTRIDGE TAPE PLAYER

[75] Inventor: John F. Castagna, Brooklyn, N.Y.

[73] Assignee: Sparkomatic Corporation, Milford, Pa.

[21] Appl. No.: 930,096

[22] Filed: Nov. 13, 1986

Related U.S. Application Data

[63] Continuation of Ser. No. 809,834, Dec. 12, 1985, abandoned, which is a continuation of Ser. No. 494,417, May 13, 1983, abandoned.

[51] Int. Cl.$^4$ ............................................. G11B 15/00
[52] U.S. Cl. ....................................................... 360/94
[58] Field of Search ....................... 360/94, 96.3–96.5, 360/137

[56] References Cited

U.S. PATENT DOCUMENTS

| | | | |
|---|---|---|---|
| 3,662,123 | 5/1972 | Huber | 360/94 |
| 3,753,566 | 8/1973 | Yoshida | 360/94 |
| 3,821,808 | 6/1974 | Wada et al. | 360/94 |
| 3,922,719 | 11/1975 | Negishi et al. | 360/94 |
| 4,317,143 | 2/1982 | Osanai | 360/137 |

*Primary Examiner*—John H. Wolff
*Attorney, Agent, or Firm*—Mason, Fenwick & Lawrence

[57] ABSTRACT

An adaptor for playing a magnetic tape cassette in a tape player for 8-track endless tape cartridges, including an adaptor housing whose horizontal width and depth dimensions and peripheral shape adjacent the bottom thereof are substantially the same as that of the endless tape cartridge to fit in the cartridge-receiving cavity of the tape player. The housing is shaped to form an upwardly opening well for receiving the magnetic tape cassette, and has a tape driving capstan for driving the cassette tape, and a capstan drive train for selectively driving the capstan from the tape drive of the cartridge player, including a pivoted power takeoff lever and pulley to couple and decouple with the cartridge tape drive, and a pivoted function control lever having an end portion movable relative to the takeoff lever to position the latter at non-driven and release positions. The function lever is releasably restrained at Play and Stop positions, and an automatic stop tape sensor lever having a sensor formation engaging the cassette tape is provided to shift the function control lever to Stop position when the tape is fully unwound from the supply reel of the cassette.

20 Claims, 6 Drawing Figures

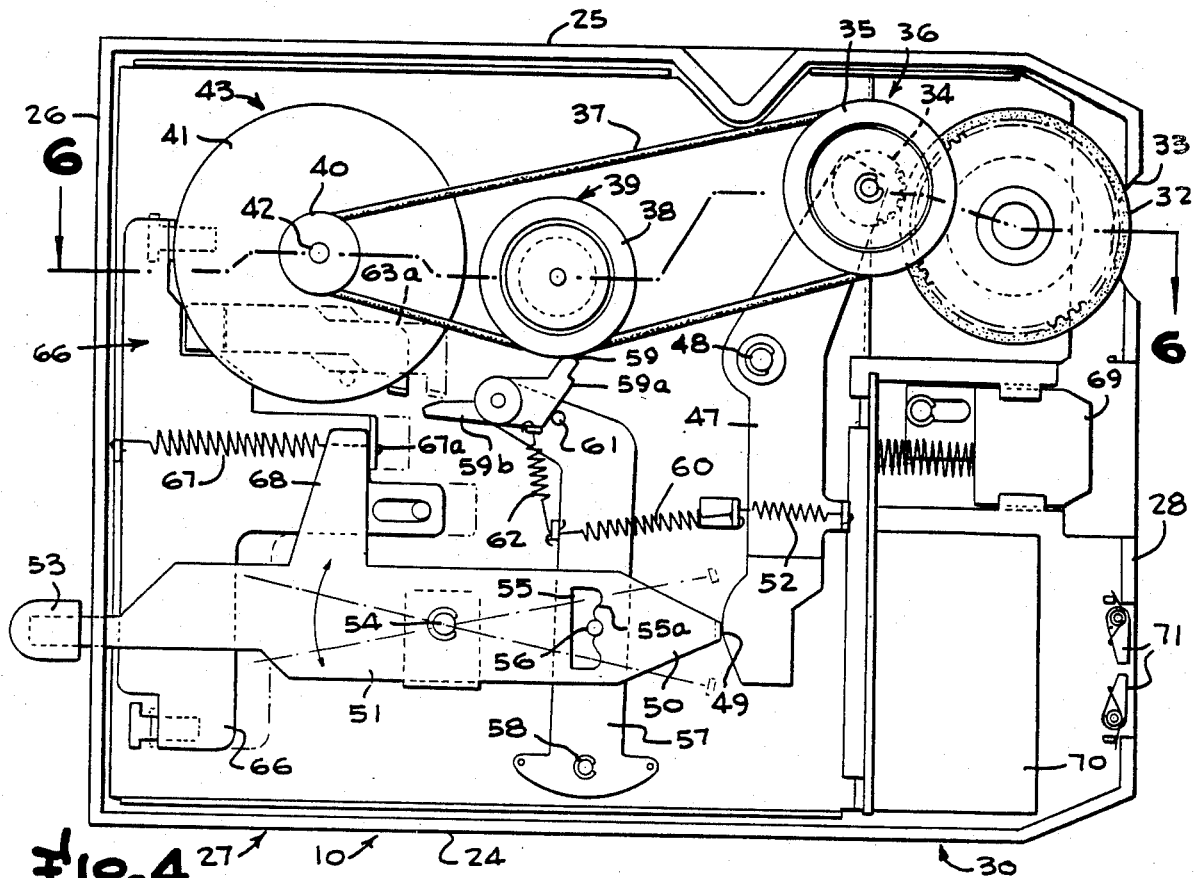
Fig-4
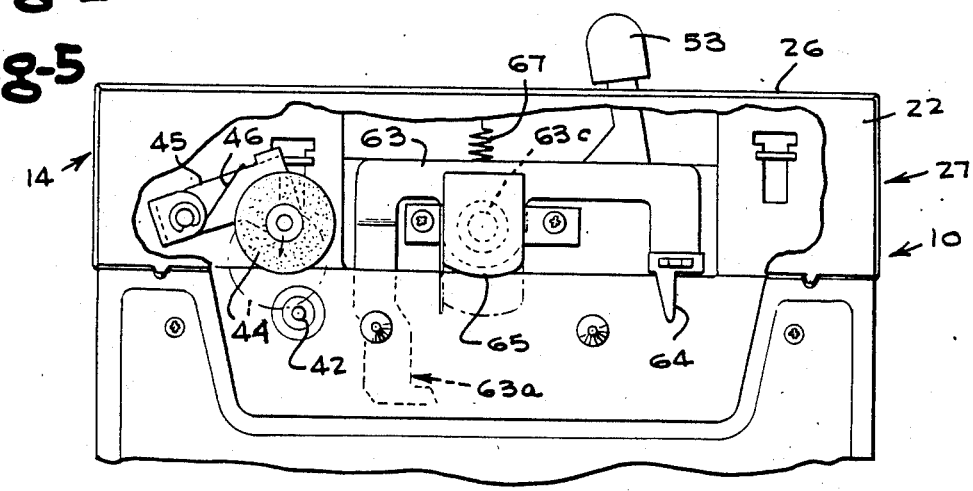
Fig-5
Fig-6

CASSETTE ADAPTOR FOR 8-TRACK CARTRIDGE TAPE PLAYER

This is a continuation of application Ser. No. 809,834, filed Dec. 12, 1985, now abandoned which is a continuation of application Ser. No. 494,417, filed May 13, 1983 now abandoned.

BACKGROUND AND OBJECTS OF THE INVENTION

The present invention relates in general to magnetic tape players for monaural or stereo sound systems, and more particularly to tape cassette adaptors for enabling standard magnetic tape cassettes to be inserted into and played by tape player components of sound systems designed for use with 8-track magnetic tape cartridges and the like, either for home or automobile stereo or monaural sound systems, allowing operation of the standard magnetic tape cassette driven from the tape driving mechanism of the 8-track cartridge type tape player.

Heretofore, many sound systems such as stereo or other high fidelity sound systems have been provided with magnetic tape player sections designed only for use with standard 8-track magnetic tape cartridges, without providing any facilities for playback from the less expensive standard magnetic tape cassettes. Customarily, in automobile stereo sound systems, which is a particularly popular type of sound system, and also in home stereo sound systems, the magnetic tape player component is usually designed so as to receive and play back either the 8-track cartridge type of magnetic tape, or the standard cassette type of magnetic tape, without any provision for interchangeability between use of tape cassettes and tape cartridges.

An object of the present invention is the provision of a novel magnetic tape cassette adaptor for magnetic cartridge type tape players for stereo sound systems and the like, wherein the adaptor is insertable into the cavity provided in a cartridge type tape player for receiving the standard 8-track cartridge, and which has provision for mounting a standard magnetic tape cassette in the adaptor.

While an adaptor for permitting standard magnetic tape cassettes to be played on tape players designed for 8-track cartridges has been disclosed in earlier U.S. Pat. No. 3,922,719 granted November 25, 1975 in the name of Tokuji Negishi et al, the adaptor of the present application has a considerably reduced number of parts substantially reducing the cost of production thereof, the design of the housing or case of the adaptor is unique reducing production costs and difficulties, an automatic stop feature is provided whereby the power pickup pulley is disconnected in stop position preventing wear and strain on the tape, and an arrangement is provided to illuminate an indicator light at the end of the tape. Other novel features include structure for minimizing trapping of the adaptor in the tape player cartridge receiving cavity where a hinged access door is provided for such cavity.

Other objects, advantages, and capabilities of the present invention will become apparent from the following detailed description, taken in conjunction with the accompanying drawings illustrating a preferred embodiment of the invention.

BRIEF DESCRIPTION OF THE FIGURES

FIG. 4 is a bottom view thereof with the bottom cover plate removed, viewed along the section plane indicated by line 4—4 of FIG. 3;

FIG. 5 is a fragmentary top plan view of the front portion of the adaptor to enlarged scale, with part of the housing broken away;

FIG. 6 is a vertical longitudinal section view taken along the line 6—6 of FIG. 4.

DETAILED DESCRIPTION OF A PREFERRED EMBODIMENT

Figure 1:
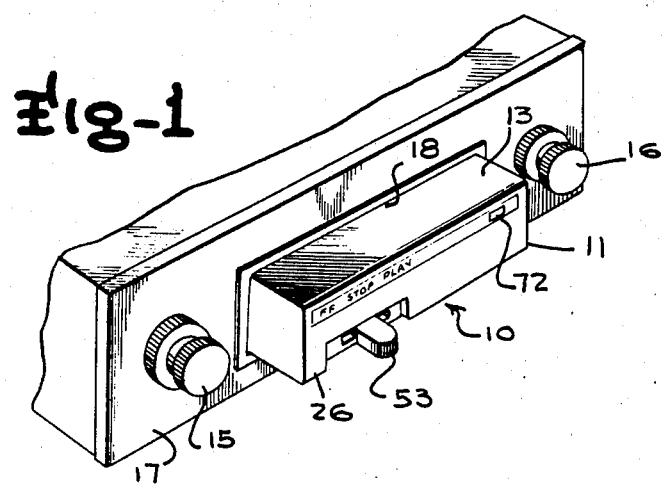
FIG. 1 is a fragmentary perspective view of the front panel portion of a stereo tape player for standard 8-track magnetic tape cartridges, showing a portion of the magnetic tape cassette adaptor of the present invention partially inserted therein.
Figure 2:
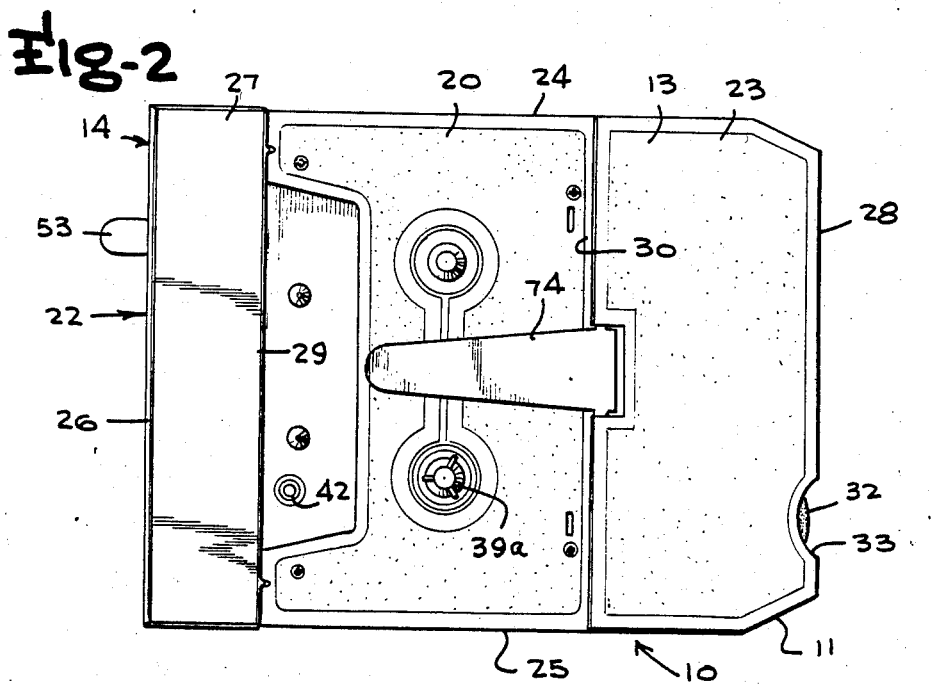
FIG. 2 is a top plan view of the magnetic tape cassette adaptor.
Figure 3:
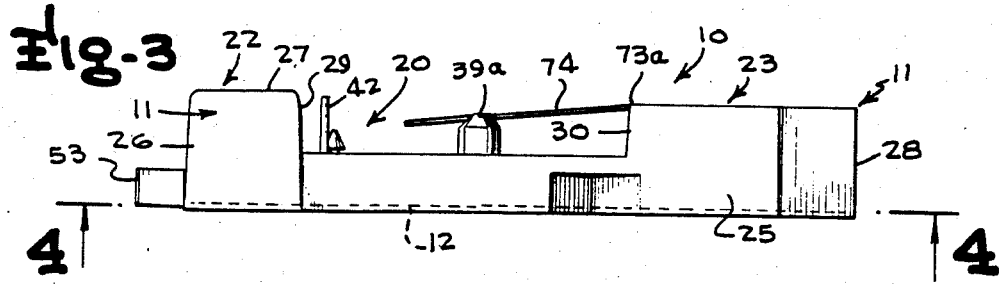
FIG. 3 is a side elevation view of the adaptor.

Referring to the drawings, wherein like reference characters designate corresponding parts throughout the several figures, the magnetic tape cassette adaptor of the present invention is indicated generally by the reference character 10, and comprises a housing or case 11 formed of two components, specifically a bottom cover plate 12 and a molded plastic downwardly opening main housing section 13, which collectively form a housing 10 which is the same size as the standard 8-track magnetic cartridge normally employed in 8-track cartridge type magnetic tape players. The front portion of a typical 8-track magnetic cassette player with which the present invention is designed to be used, is indicated generally by the reference character 14, which in this case is a typical below-dash or in-dash auto stereo tape player, which typically has at least two main control knobs 15, 16, one providing on/off and volume control and the other providing, for example, base and treble amplitude control. The cartridge type tape player 14 has the typical generally flat front panel 17 with the control knobs 15 and 16 projecting to forwardly accessible positions from the front panel 17, and having a forwardly opening cavity 18 of generally rectangular vertical cross-section sized to receive the 8-track magnetic tape cartridge. It will be appreciated, therefore, that the magnetic tape cassette adaptor 10 of the present invention sized to correspond to the size of the 8-track magnetic tape cartridge may be inserted into the cavity 18 of the magnetic tape player in the same manner as the cartridge.

The cassette adaptor 10 of the present invention includes an intermediate well or recess 20 to receive a standard magnetic tape cassette 21 therein in nested relation, with the well 20 flanked fore and aft by a front housing section 22 and rear housing section 23, which along with the well 20 transversely span the entire width of the housing 11 between the side walls 24, 25, of the main housing member 13. The front housing section 22 is bounded by a front vertical wall 26, a horizontal top wall 27 and the forward portions of the side walls 24, 25 and the rear housing section 23 is bounded by the rear wall 28 and the side walls 24, 25, and both housing sections 22 and 23 have shallower vertical wall portions 29, 30 forming the vertical front and rear bounding walls of the channel shaped well 20.

The internal mechanism of the magnetic tape cassette adaptor 10 is illustrated particularly in FIGS. 4, 5 and 6 and comprises a rotatably journaled rubber faced idler wheel 32 having a rubber faced peripheral surface adapted to extend rearwardly into the opening defined by the concave recess 33 in the rear wall 28 of the housing 11 to be disposed in driven engagement with the normal tape drive capstan in a conventional 8-track magnetic tape cartridge type tape player when the adaptor is inserted fully into the cavity 18. The rubber faced periphery of the idler wheel 32 also engages the rubber faced periphery of the driven wheel portion 34 of a power takeoff pulley 35 also located in the housing 11. The pulley portion 36 has a drive belt 37 trained around its periphery which engages the periphery of a wheel member 38 forming part of the takeup reel clutch assembly 39 which includes the takeup spindle 39a for the tape of the cassette 21, and is also trained around the pulley formation 40 assembled with a flywheel portion 41 and cassette tape capstan portion 42 of a composite flywheel assembly 43, the cassette tape drive capstan 42 of which projects upwardly into the well 20 to engage the cassette tape. A pinch roller 44 mounted on a pinch roller lever 45 having a pressure spring 46 associated therewith is provided in the front portion 22 to pinch the cassette tape against the capstan 42.

The power takeoff pulley 35 is rotatably journaled on one end portion of the power takeoff lever 47 whose midportion is pivotally mounted on pivot post 48 in the housing 11. The other oppositely extending end portion of lever 47 has a shaped abutment surface 49 confronting the end portion 50 of a three position lever 51 having Play, Stop, and Fast Forward positions. The power takeoff lever 47 is biased in a clockwise direction as viewed in FIG. 4 by the power lever tension spring 52 and its forward movement is limited by stop 52a. The three position lever 51 includes a forwardly projecting end portion providing a manually operable manipulator formation 53 exposed for manipulation at the front of the adaptor, and is pivoted in its midregion on the pivot post 54.

The lever 51 includes a shaped opening 55 providing three detent recesses co-acting with a pin 56 on the autostop lever member 57 which is pivoted adjacent one of its ends on the pivot post 58 and carries a pivoted trip lever 59 on its opposite end. The pin 56 is biased by the tension spring 60 toward the detenting surface of the opening 55 defining the three detent recesses 55a locating the three set positions of the lever 51 and the trip lever is biased to the position determined by the stop pin 61 by tension spring 62. The trip lever 59 includes a nose 59a which may be brought into engagement with the wheel member 38 of the takeup reel clutch assembly 39 and includes a trip finger 59b located adjacent and in the path of movement of the lower trip portion 63a of the auto-stop tape sensor lever 63 whose upper portion 63b includes a sensor tip 64 which projects into contact with the magnetic tape of the cassette 21 located in the well 20.

The playback head 65, shown in FIG. 5, and the pinch roller 44 are mounted on a playback head, and pinch roller bar 66 (FIG. 4) which is rectilinearly slidable in a fore-and-aft direction and is spring biased to the retracted forward position by tension spring 67. A shoulder formation 68 of the three position lever 51 confronts an abutment 67a of the bar 66 so that when the three position lever 51 is moved to the Play position, the shoulder formation 68 engaging the abutment 67a shifts the playback head and pinch roller bar 66 to the rearward position pinching the cassette tape against the capstan 42 and locating the playback head 65 against the tape. To couple the playback head 65 to the electronics of the 8-track cartridge tape player, a transducer head 69 is provided in the rear portion of the adaptor, movable through a limited fore- and-aft stroke and spring biased forwardly, connected to the amplifier/equalizer 70 to transfer the audio from the playback head 65 of the adaptor to the pickup head of the 8-tracktape player. Additionally, power pickup terminals 71 are provided at the rear of the adaptor to pick up power from the 8-track deck or player channel changer to operate the amplifier 70 and to illuminate the stop light 72 provided at the front of the adaptor case at the end of cassette tape play.

To protect against accidental trapping of the adaptor, in unloaded condition, in the cavity 18, a pivoted clip 73, hinged as indicated at 73a at one end to the rear housing section 23 to pivot about a horizontal axis, is provided, which has a long tongue 74 spanning a major portion of the front-to-back width of the well 20. This prevents the 8-track player door, if one is present, from binding the adaptor in the tape player.

It will be apparent that upon insertion of the adaptor 10 with a cassette 21 in the well 20 thereof into the cavity 18 of the 8-track cartridge player, the transducer head 69 will be positioned to magnetically couple with the playback head of the cartridge player and the power pickup terminals 71 will connect power to the amplifier and equalizer 70 of the adaptor. With the three position lever 51 in the Stop position, its end 50 is located to engage the forwardmost portion of the shaped abutment surface 49 of the power takeoff lever 47 and position it so that the drive wheel portion 34 of the power takeoff pulley 35 is out of engagement with the rubber faced idler wheel 32. Upon movement of the three position lever 51 to the Play position, its shoulder formation 68 engaging the abutment 67a on bar 66 moves the rectilinearly slidable bar 66 rearwardly to position the pinch roller 44 to engage the cassette tape against the capstan 42 and position the playback head 65 in proper play position, and the end portion 50 of the three position lever 51 moves out from contact with the power takeoff lever 47, whereupon its tension spring 52 rotates the power takeoff lever to place the takeoff pulley wheel 34 in driven contact with the rubber faced idler wheel 32 which is being driven from the cartridge tape player. The drive belt 37 thus transfers rotary drive to the takeup reel clutch 38 of conventional construction causing the cassette pickup reel to rotate and also the drive belt 37 rotates the capstan pulley formation 40 driving the capstan 42.

At the end of tape play, the sensor tip 64 of the autostop tape sensor lever 63 which is in engagement with the tape senses the tension of the tape after one spool of the cassette is completely unwound and tape travel is restricted. The sensor lever tip 64 is thus pushed forwardly from the tape, rotating the sensor lever about its pivot post 63c and causing the lower trip portion 63a to move rearwardly to trip the trip lever 59 and cause its nose 59a to engage the wheel member 38, thereupon pushing the adjacent end of the stop lever 57 downwardly, as viewed in FIG. 4, releasing the detenting pin 56 from the detent recess formation 55a of the three position lever 51 which occupied the Play position. Since the lever 51 is under spring tension from the spring 67 urging the bar 66 and its abutment 67a and the three position lever shoulder formation 68a forwardly, lever 51 is thus returned to the Stop position, causing its end portion 50 to engage the shaped formation 49 of the power takeoff lever 47 and move the lever 47 to the release position disengaging the driven wheel 34 from the rubber faced idle wheel 32 and terminating drive. This releases all rotating torque from the system and stops all functions. Also, the forward movement of the playback head and pinch roller supporting bar 66 by its spring 67 also moves the pickup head 65, the sensing tape lever tip 64 and the pinch roller 44 out of the cassette so that the cassette can be removed. Because of the particular arrangement wherein the lever 59 is simply tripped by the end portion 63a of the auto-stop sensor lever 63, and thereafter the power for moving the lever 57 is derived from the powered wheel 38, very little force is required to be applied to the trip lever 59 by the sensor lever 63.

I claim:

1. An adaptor for playing a magnetic tape cassette in a tape player for endless tape cartridges, comprising an adaptor housing whose horizontal width and depth dimensions and peripheral shape adjacent the bottom thereof are substantially the same as that of the endless tape cartridge and having substantially a "U" shaped profile in vertical side elevation providing an intermediate upwardly opening well for receiving a magnetic tape cassette flanked by front and rear housing portions transversely spanning the adaptor, a tape driving capstan in the housing for driving the cassette tape, capstan drive means for selectively driving said capstan from the tape drive of the cartridge player including a pivoted power takeoff lever having a rotatable wheel means carried thereby movable to driven and non-driven positions to couple and decouple the same with said tape drive, a function control lever pivoted in said housing having an end portion movable to and from a position relative to said takeoff lever to position the same at said non-driven position and release it to assume said driven position, positioning means releasably restraining said function lever at Play and Stop positions, an elongated automatic stop tape sensor lever rotatable about a pivot post within the housing have a sensor tip formation at one end thereof engaging the cassette tape and activated thereby when the tape is fully unwound from the supply reel of the cassette to force the sensor lever to a stop position, and means engaged by a second end of said sensor lever at an end thereof opposite said one end responsive to movement of said sensor lever to said stop position to activate said positioning means when restraining said function lever at Play position and effect pivotal shifting of the function lever to Stop position.

2. An adaptor for playing a magnetic tape cassette in cartridge type tape players as defined in claim 1, wherein said rotatable wheel means is a first pulley mounted on and adjacent an end portion of said takeoff lever, and said capstan drive means including a capstan pulley having an associated flywheel, and a drive belt trained about said capstan pulley and said first pulley on said takeoff lever.

3. An adaptor for playing a magnetic tape cassette in a cartridge type tape player as defined in claim 2, wherein said positioning means releasably restraining said function lever at Play and Stop positions comprises a pivoted stop lever having detent means coactive with shaped surfaces on said function control lever to restrain the latter in either of said Play and Stop positions, and means movable by said sensor lever into force deriving relation to a powered source to shift the stop lever to function control lever releasing position.

4. An adaptor for playing a magnetic tape cassette in a cartridge type tape player as defined in claim 2, wherein said positioning means releasably restraining said function lever at Play and Stop position comprises a pivoted stop lever having detent means coactive with shaped surfaces on said function control lever to restrain the latter in either of said Play and Stop positions, said stop lever having contact means engageable with a moving surface of said capstan drive means to derive driving force from said capstan drive means supplying the force for moving said stop lever to release said positioning means releasably restraining said function lever.

5. An adaptor for playing a magnetic tape cassette in a cartridge type tape player as defined in claim 4, wherein said means supplying the force for moving said stop lever to release the detenting means comprising a trip lever having a first shaped portion engageable by a portion of said tape sensor lever and a second shaped portion to engage a moving portion of said capstan drive means and apply moving force therefrom to said stop lever to move the latter to release the detenting means.

6. An adaptor for playing a magnetic tape cassette in a cartridge type tape player as defined in claim 2, including a takeup reel spool and clutch assembly for driving the takeup reel of the cassette, and said drive belt extending into driven engagement with a wheel portion of said takeup reel spool and clutch assembly for driving the takeup reel spool.

7. An adaptor for playing a magnetic tape cassette in a cartridge type tape player as defined in claim 6, wherein said positioning means releasably restraining said function lever at Play and Stop positions comprises a pivot stop lever having detent means coactive with shaped surfaces on said function control lever to restrain the latter in either of said Play and Stop positions, and means movable by said sensor lever into force deriving relation to a powered source to shift the stop lever to function control lever releasing position.

8. An adaptor for playing a magnetic tape cassette in a cartridge type tape player as defined in claim 6, wherein said positioning means releasably restraining said function lever at Play and Stop positions comprises a pivoted stop lever having detent means coactive with shaped surfaces on said function control lever to restrain the latter in either of said Play and Stop positions, said stop lever having contact means engageable with a moving surface of said capstan drive means to derive driving force from said capstan drive means supplying the force for moving said stop lever to release said positioning means releasably restraining said function lever.

9. An adaptor for playing a magnetic tape cassette in a cartridge type tape player as defined in claim 8, wherein said means supplying the force for moving said stop lever to release the detenting means comprising a trip lever having a first shaped portion engageable by a portion of said tape sensor lever and a second shaped portion to engage a moving portion of said capstan drive means and apply moving force therefrom to said stop lever to move the latter to release the detenting means.

10. An adaptor for playing a magnetic tape cassette in a cartridge type tape player as defined in claim 8, wherein said housing includes an end-of-tape indicator light visible from in front of the adaptor, and electrical circuit means deriving electrical power from rhe cartridge player energized upon and responsive to the cassette tape being fully driven to unwound condition to illuminate said indicator light.

11. An adaptor for playing a magnetic tape cassette in a cartridge type tape player as defined in claim 6, wherein said housing includes an end-of-tape indicator light visible from in front of the adaptor, and electrical circuit means deriving electrical power from the cartridge player energized upon and responsive to the cassette tape being fully driven to unwound condition to illuminate said indicator light.

12. An adaptor for playing a magnetic tape cassette in a cartridge type tape player as defined in claim 1, wherein said positioning means releasably restraining said function lever at Play and Stop positions comprises a pivoted stop lever having detent means coactive with shaped surfaces on said function control lever to restrain the latter in either of said Play and Stop positions, and means movable by said sensor lever into force deriving relation to a powered source to shift the stop lever to function control lever releasing position.

13. An adaptor for playing a magnetic tape cassette in a cartridge type tape player as defined in claim 12, wherein said housing includes an end-of-tape indicator light visible from in front of the adaptor, and electrical circuit means deriving electrical power from the cartridge player energized upon and responsive to the cassette tape being fully driven to unwound condition to illuminate said indicator light.

14. An adaptor for playing a magnetic tape cassette hn a cartridge type tape player as defined in claim 12, wherein said housing includes an anti-trap protective clip member having an elongated blade-like tongue hinged at its rearmost end about a horizontal axis to said rear housing portion and extending forwardly therefrom across a major portion of the front-to-rear span of said well, and means disposing said tongue at a distance above the bottom of said well to engage and hold any door closure for the cartridge-receiving well of the tape player.

15. An adaptor for playing a magnetic tape cassette in a cartridge type tape player as defined in claim 1, wherein said positioning means releasably restraining said function lever at Play and Stop positions comprises a pivoted stop lever having detent means coactive with shaped surfaces on said function control lever to restrain the latter in either of said Play and Stop positions, said stop lever having contact means engageable with a moving surface of said capstan drive means to derive driving force from said capstan drive means supplying the force for moving said stop lever to release said positioning means releasably restraining said function lever.

16. An adaptor for playing a magnetic tape cassette in a cartridge type tape player as defined in claim 15, wherein said housing includes an end-of-tape indicator light visible from in front of the adaptor, and electrical circuit means deriving electrical power from the cartridge player energized upon and responsive to the cassette tape being fully driven to unwound condition to illuminate said indicator light.

17. An adaptor for playing a magnetic tape cassette in a cartridge type tape player as defined in claim 15, wherein said housing includes an anti-trap protective clip member having an elongated blade-like tongue hinged at its rearmost end about a horizontal axis to said rear housing portion and extending forwardly therefrom across a major portion of the front-to-rear span of said well, and means disposing said tongue at a distance above the bottom of said well to engage and hold any door closure for the cartridge-receiving well of the tape player.

18. An adaptor for playing a magnetic tape cassette in a cartridge type tape player as defined in claim 15, wherein said means supplying the force for moving said stop lever to release the detenting means comprising a trip lever having a first shaped portion engageable by a portion of said tape sensor lever and a second shaped portion to engage a moving portion of said capstan drive means and apply moving force therefrom to said stop lever to move the latter to release the detenting means.

19. An adaptor for playing a magnetic tape cassette in a cartridge type tape player as defined in claim 1, wherein said housing includes an end-of-tape indicator light visible from in front of the adaptor, and electrical circuit means deriving electrical power from rhe cartridge player energized upon and responsive to the cassette tape being fully driven to unwound condition to illuminate said indicator light.

20. An adaptor for playing a magnetic tape cassette in a cartridge type tape player as defined in claim 1, wherein said housing includes an anti-trap protective clip member having an elongated blade-like tongue hinged at its rearmost end about a horizontal axis to said rear housing portion and extending forwardly therefrom across a major portion of the front-to-rear span of said well, and means disposing said tongue at a distance above the bottom of said well to engage and hold any door closure for the cartridge-receiving well of the tape player.

* * * * *